March 26, 1940.　　E. E. MOYER ET AL　　2,195,119
ELECTRIC CONTROL SYSTEM
Filed Sept. 30, 1938
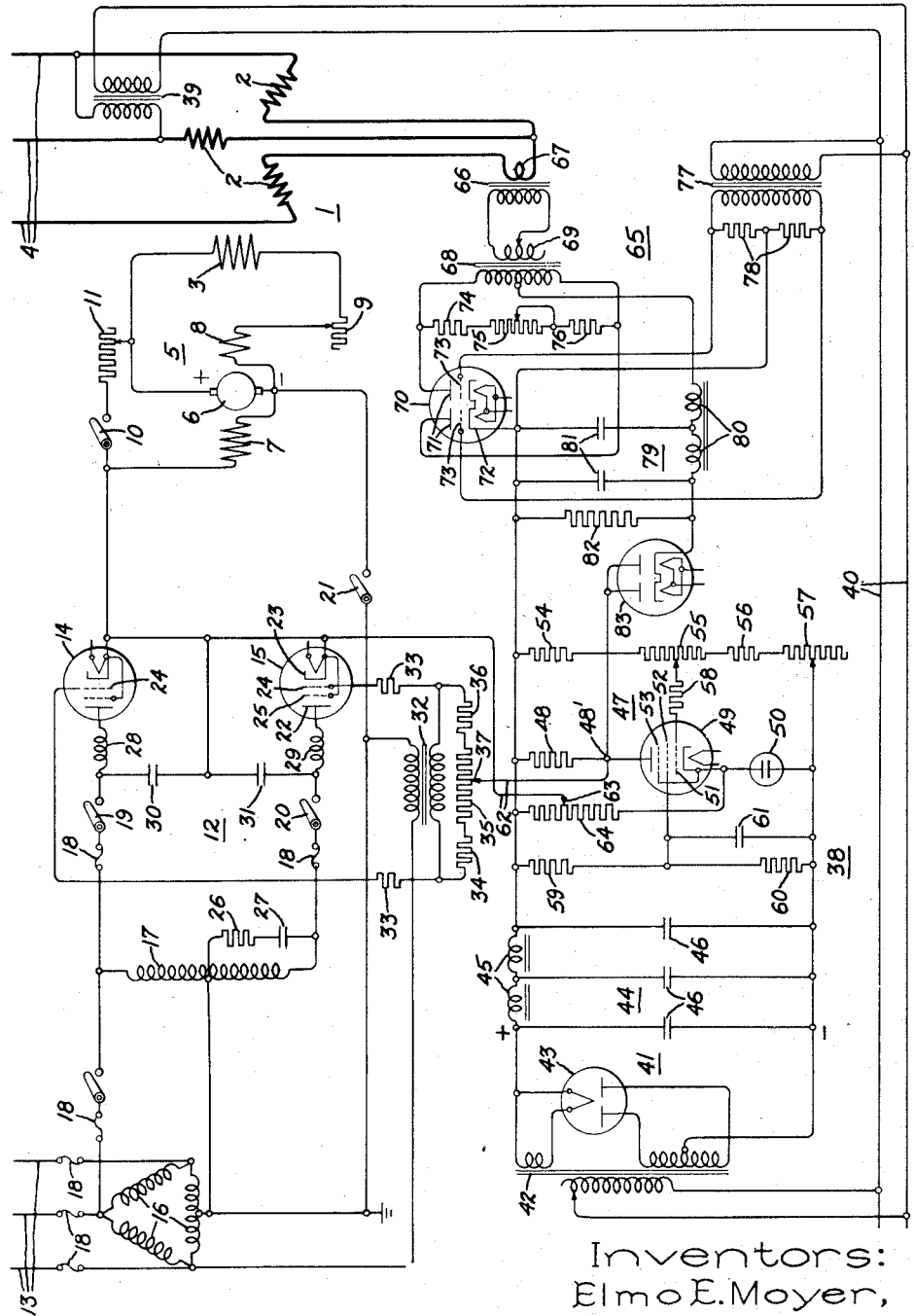
Inventors:
Elmo E. Moyer,
Orrin W. Livingston,
by Harry E. Dunham
Their Attorney.

Patented Mar. 26, 1940

2,195,119

UNITED STATES PATENT OFFICE 2,195,119

ELECTRIC CONTROL SYSTEM

Elmo E. Moyer, Scotia, and Orrin W. Livingston, Schenectady, N. Y., assignors to General Electric Company, a corporation of New York Application September 30, 1938, Serial No. 232,598

15 Claims. (Cl. 171—119)

Our invention relates to electric valve control systems and more particularly to electric valve regulating systems for dynamo-electric machines.

Electric valve apparatus is particularly adaptable to systems for controlling the operation of dynamo-electric machines because of the rapidity of response of such apparatus. Electric valve means are particularly suitable for use in voltage regulating systems for alternating current machines of the synchronous type, since the electric valve means respond without appreciable delay to variable voltage conditions, tending to increase the stability of synchronous systems. Heretofore, electric valve apparatus has been applied to excitation or control systems for synchronous alternating current generators and synchronous condensers. In accordance with the teachings of our invention described hereinafter there is provided an improved electric valve system for controlling synchronous alternating current machines, particularly synchronous condensers, whereby the system controls the condenser to distinguish between leading and lagging power factor of the current transmitted by the armature windings of the condenser.

It is an object of our invention to provide new and improved electric valve circuits.

It is another object of our invention to provide new and improved control or regulating systems for dynamo-electric machines.

It is a further object of our invention to provide new and improved voltage regulating systems for alternating current machines of the synchronous type.

It is a still further object of our invention to provide new and improved voltage regulating systems for synchronous condensers.

In accordance with the illustrated embodiment of our invention we provide a new and improved voltage control or regulating system for synchronous condensers whereby the armature voltage of the condenser is controlled and whereby the current in the leading region of operation is limited in order to prevent an overload of the condenser. The excitation or field winding of the synchronous condenser is energized by an exciter, and the field winding of the exciter is energized from an alternating current circuit through electric valve means of the controlled type. The conductivities of the electric valve means are controlled conjointly by means of a voltage determining or controlling circuit and by means of a circuit which is responsive to the power factor of the armature current of the synchronous condenser. The voltage controlling circuit comprises a source of variable unidirectional voltage which varies in magnitude in accordance with the voltage of the armature winding of the synchronous condenser, and also includes a serially-connected resistance and an electronic discharge device which impress a variable biasing potential on control members of the electric valve means. The voltage drop appearing across the terminals of the resistance is limited by means of the current responsive circuit which responds to predetermined currents of predetermined power factor transmitted by the armature windings of the condenser. The current controlling circuit is selectively responsive to the power factor of the armature current of the condenser and limits the current in the leading region of operation to a predetermined value.

For a better understanding of our invention reference may be had to the following description taken in connection with the accompanying drawing, and its scope will be pointed out in the appended claims. The single figure of the accompanying drawing diagrammatically illustrates an embodiment of our invention as applied to an excitation system for energizing the field winding of a synchronous condenser and in which the current control circuit is responsive to the armature current of the synchronous condenser.

In the single figure of the accompanying drawing we have chosen to show our invention as applied to an excitation system for an alternating current dynamo-electric machine, such as a synchronous condenser 1, having armature windings 2 and an excitation or field winding 3. The armature windings 2 may be connected to an alternating current circuit 4. Field winding 3 may be variably energized by an exciter 5 having an armature winding 6, a shunt field winding 7, and a series field winding 8. A suitable current controlling means, such as a variable resistance 9, may be connected in series relation with the series winding 8, if desired, and the positive terminal of the armature winding 6 may be connected to one terminal of the shunt winding 7 through a switch 10 and a current controlling resistance 11 if it is desired to operate the exciter 5 as a self-excited machine.

The excitation of the synchronous condenser 1 is controlled by the exciter 5, and the excitation of the exciter 5 in turn is controlled by means of a circuit 12 comprising an alternating current circuit 13 which may be connected to the alternating current circuit 4, if desired, and which also comprises electric valve means 14 and 15 and transformers 16 and 17. Suitable current limiting devices such as fuses 18 may be connected at various places in the circuit 12, as indicated, to protect the associated apparatus. Switches 19 and 20 may be connected in the anode-cathode circuits of the electric valves 14 and 15 to disconnect these valves when desired, and a switch 21 may be connected between circuit 12 and the exciter 5 if it is desired to operate the exciter 5 as a self-excited machine. Electric valve means 14 and 15 are preferably of the type employing an ionizable medium such as a gas or a vapor, and each comprises an anode 22, a cathode 23, a control member or grid 24, and a shield grid 25 which may be connected to the cathode 23. In order to dispense with the necessity of a phase shifting circuit where a displacement between anode-cathode and grid voltages is desired, we employ an arrangement as shown wherein the transformer 17 is connected to obtain a quadrature voltage from the transformer 16. The transformer 17 is employed substantially as an auto-transformer, and a surge arrester may be connected across a portion thereof to absorb transient voltages which may appear in circuit 13 to protect the electric valve apparatus. The surge arrester may comprise a serially-connected resistance 26 and a capacitance 27. In addition, if it is desired to suppress high frequency parasitic oscillations in the circuit 12, a filter circuit may be employed. We show a filter circuit comprising air core inductances 28 and 29 and capacitances 30 and 31.

Alternating voltages of quadrature lagging phase displacement relative to the anode-cathode voltages of electric valves 14 and 15 are impressed on control grids 24 by means of a transformer 32 which is connected to be energized from transformer 16. Current limiting resistances 33 may be connected in series relation with the control grids 24. In order to balance the currents conducted by electric valves 14 and 15, we provide a voltage divider comprising serially-connected resistances 34, 35, and 36 which are connected across the secondary winding of transformer 32. Resistance 35 may be provided with an adjustable tap 37 to control the magnitude of the alternating components of voltage impressed on grids 24.

A voltage control or determining circuit 38 is employed to control the resultant voltage impressed on control grids 24 of electric valves 14 and 15 and hence controls the excitation and voltage of the synchronous condenser 1. The voltage controlling circuit 38 is energized in accordance with the armature voltage of condenser 1 or in accordance with the voltage of circuit 4 through a transformer 39 and circuit 40. To produce a control voltage which varies in accordance with the voltage of circuit 4 or the armature voltage of condenser 1, we employ a suitable rectifying circuit 41 which may be of the bi-phase type comprising a transformer 42 and a suitable unidirectional conducting device such as an electric valve 43. The output circuit of the rectifier 41 is connected to a suitable filter circuit 44 comprising inductances 45 and capacitances 46. As a means for amplifying the variations in magnitude of the variable unidirectional voltage produced by rectifier 41, we employ a suitable amplifier 47, such as that disclosed and claimed in copending patent application Serial No. 232,599 of E. E. Moyer, filed concurrently herewith, and assigned to the assignee of the present application. The amplifier 47 comprises a serially-connected impedance element, such as a resistance 48, and an electronic discharge device 49 having a common junction 48', and a constant voltage device or element such as a glow discharge valve 50 connected in series relation across the output circuit of the rectifier 41 and the associated filter circuit 44. The electronic discharge device 49 is preferably of the high vacuum type having a control grid 51, a screen grid 52 which is employed as a second control grid, and a suppressor grid 53. There is impressed on the control grid 51 a predetermined component of the variable unidirectional voltage supplied by rectifier 41 through a suitable voltage divider comprising serially-connected resistances 54—57. A current limiting resistance 58 may be connected in series relation with the control grid 51, if desired. In like manner, the screen grid 52 may be energized from a voltage divider which is connected to the output circuit of the rectifier 41 and which may comprise serially-connected resistances 59 and 60. A capacitance 61 may be connected between the lower terminal of the glow discharge valve 50 and the screen grid 52 to absorb extraneous transient voltages which may be present in the system. Output circuit 62 of circuit 47 may be connected to the common juncture of resistance 48 and electric valve 49, and to a point 63 of a resistance 64 which is connected between the positive terminal of the output circuit of rectifier 41 and the common juncture of the electronic discharge device 49 and glow discharge valve 50. Point or tap 63 may be adjustable to permit adjustment of the resultant unidirectional biasing potential impressed on control grids 24 of electric valves 14 and 15.

We provide a current controlling circuit 65 which is responsive to the power factor of the armature current of the synchronous condenser 1 and controls the voltage controlling circuit 38 to distinguish between leading and lagging current transmitted by the armature windings 2 of condenser 1. The current controlling circuit 65 may include a current transformer 66 having a primary winding 67 which is connected in series relation with windings 2 and may include a transformer 68 having an adjustable primary winding 69, and an electronic discharge device 70. The electronic discharge device 70 may be of the high vacuum type or of the type employing an ionizable medium such as a gas or a vapor. We prefer to employ the former type. The electronic discharge device 70 serves as a controlled rectifier and also may be of the type comprising two electric discharge paths within a single envelope and may comprise anodes 71, an electrically common cathode 72, and control grids 73. The anode-cathode circuits of electronic discharge device 70 are energized from transformer 68, and a suitable voltage divider for effecting adjustment of the armature current control may be connected across the secondary winding of transformer 68. This voltage divider may comprise resistances 74, 75, and 76. Resistance 75 may be employed to effect the precise adjustment of the current controlling circuit 65, whereas the adjustable winding 69 of transformer 68 may be employed to effect the rough or coarse adjustment. Certain broad features of the circuit for controlling the system in response to the power factor are disclosed and claimed in copending patent application S. N. 211,453 of Richard Modlinger, filed June 2, 1938, and which is assigned to the assignee of the present application.

Control grids 73 of electronic discharge device 70 are energized in accordance with the voltage of armature windings 2 or in accordance with the voltage of circuit 4 through a transformer 77 which is connected to circuit 40. To obtain a neutral connection, a voltage divider comprising resistances 78 may be connected across the secondary winding of transformer 77.

To permit transient or short-time current overloads in the leading region of operation of the synchronous condenser 1, we provide a damping circuit 79 which is connected in the output circuit of the current controlling circuit 65. The damping circuit comprises inductances 80 and capacitances 81. A relatively high impedance 82 may be connected across the output circuit of the current controlling circuit 65. As a means for bringing into operation the current limiting feature of the current controlling circuit 65, we employ a suitable unidirectional conducting device, such as an electric valve 83, which is connected between the output circuit of the current controlling circuit 65 and resistance 48 of circuit 42. So long as the voltage of circuit 65 remains below a predetermined value, electric valve 83 does not conduct current, and hence the circuit 47 operates substantially independently of circuit 65. However, if the leading current transmitted by the armature windings 2 of condenser 1 exceeds a predetermined value, the current controlling circuit 65 effectively controls the circuit 38 to maintain a substantially constant condenser armature current.

The operation of the embodiment of our invention shown in the figure of the drawing will be explained by considering the system when the machine 1 is operating as a synchronous condenser. Exciter 5 transmits variable amounts of current to field winding 3 of condenser 1 in accordance with the voltage of circuit 4. The excitation of exciter 5 is controlled by circuit 12 which, in turn, is controlled by the voltage controlling circuit 38. Electric valves 14 and 15 conduct variable amounts of current to field winding 7 of exciter 5. It will be understood by those skilled in the art that the average current conducted by the electric valves 14 and 15 increases as the voltages impressed on the control grids 24 are advanced from a lagging position to one of phase coincidence with the anode voltages, and conversely, the anode circuit currents decrease as the grid voltages are displaced or retarded in phase. The resultant voltages impressed on the control grids 24 are comprised of two components, one being the alternating component displaced substantially 90 electrical degrees relative to the anode-cathode voltages and obtained through transformers 16 and 32. The other component of voltage is the variable component of voltage derived from circuit 47.

Because many synchronous condensers are designed and constructed to deliver a predetermined amount of leading reactive volt-amperes to an associated circuit and by virtue of the relatively high field excitation required to deliver this load, the maximum or limiting capacity of the condenser is usually established in that region of operation. Thus, it is important to limit the amount of leading volt-amperes which the condenser may transmit. Furthermore, it is desirable in many instances to permit the condenser to transmit a large amount of lagging volt-amperes without imposing a limitation, since under such conditions the field current is substantially reduced and the heating of the condenser is much less than when operating in the leading region. Circuit 65 cooperates with circuit 38 to limit the amount of leading reactive volt-amperes which the synchronous condenser 1 may deliver. If it be assumed that the load transmitted by the condenser 1 is not excessive and is within the predetermined range of values, the voltage controlling circuit 38 varies the conductivity of electric valves 14 and 15 to maintain the armature voltage of condenser 1 substantially constant. Electronic discharge device 49 in circuit 38 transmits variable amounts of unidirectional current through resistance 48, and the voltage difference between points 48' and 63 is impressed on the control grids 24 of electric valves 14 and 15. Due to the fact that both control grids 51 and 52 of electronic discharge device 49 vary in potential with the voltage changes of circuit 4, the amplification of circuit 47 is accentuated, effecting precise control of the voltage of circuit 4.

So long as the armature current of condenser 1 does not exceed the predetermined range of values in the leading region of operation, circuit 38 controls the voltage of condenser 1 substantially independently of circuit 65. However, if the leading current exceeds a predetermined value, the output voltage of circuit 65 and hence the voltage appearing across resistance 82 attains a value sufficient to cause electric valve 83 to conduct current. Upon being rendered conductive, electric valve 83 is effective to limit the minimum value of voltage appearing across the terminals of resistance 48 in circuit 47, thereby controlling the maximum conductivity of the electric valves 14 and 15 and limiting the excitation of condenser 1. By such limitation in the excitation, the armature current of condenser 1 is maintained at a substantially constant value when the leading reactive volt-amperes tend to exceed a definite value, thereby preventing overload and excessive heating of the condenser.

If, on the other hand, the condenser 1 is transmitting lagging reactive volt-amperes to circuit 4, as, for example, when the voltage of circuit 4 tends to rise above a predetermined value, circuit 65 does not affect circuit 38 by virtue of the fact that the electronic discharge device 70 conducts a substantially smaller current than when the condenser 1 is transmitting leading reactive volt-amperes. This selective controlling operation of the circuit 65 is obtained by the manner in which the anode-cathode circuits and the grid circuits of electronic discharge device 70 are energized. Were it not for this selective controlling action of the circuit 65, the system would operate by locking in to cause the synchronous condenser 1 to supply a fixed amount of lagging reactive volt-amperes. Circuit 65, acting conjointly with the circuit 38, prevents the system from supplying a predetermined fixed number of lagging reactive volt-amperes and permits the desired control of the excitation of the synchronous condenser 1 within the lagging region of operation. When the armature current of condenser 1 is leading, the current conducted by the electronic discharge device 70 is large, but when the current is lagging, the phase displacement between the anode-cathode circuits and the grid circuits is increased, effecting a substantial decrease in the anode-cathode output voltage and current. Therefore, the circuit 65 does not modify the operation of the voltage controlling circuit 38 when the condenser 1 is operating in the lagging region.

While it is undesirable to permit sustained overload conditions of the condenser 1 in the leading region of operation it is desirable, and in many cases necessary, to permit short-time or transient overloads in this region. To permit such transient overloads in the leading region, the damping circuit 79 has a definite time lag and permits substantial transient overload swings.

Referring now more particularly to the operation of circuit 47, the electronic discharge device 49 varies the voltage of output circuit 62 in a manner to amplify the voltage variations of the output circuit of rectifier 41 and filter circuit 42. The entire voltage change, which may be an increment or a decrement of the output voltage of rectifier 41, is impressed on the control grid 24 by virtue of the fact that the voltage appearing across the terminals of the glow discharge valve 50 remains constant. In addition, a predetermined component of the instantaneous voltage appearing across the output circuit of rectifier 41 is impressed upon the control grid 52. In this manner the electronic discharge device 49 effects a relatively high amplification of the voltage of circuit 41 and hence amplifies changes in the voltage of the alternating current circuit 4, or of the armature voltage of condenser 1. Circuit 47 may be arranged so that the point 63 is positive in potential relative to that of point 48' when the power factor of the armature current of condenser 1 is lagging. Furthermore, the circuit may be arranged so that the potential of point 63 is negative with respect to that of point 48' when the power factor of the armature current of condenser 1 is leading.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an alternating current dynamo-electric machine having an armature winding and a field winding, means for controlling the energization of said field winding and comprising a source of alternating current and electric valve means having a control member for controlling the conductivity thereof, voltage controlling means for energizing said control member to control the current conducted by said electric valve means and comprising an electronic discharge device for impressing on said control member a voltage which varies in accordance with the voltage of said armature winding, and means for controlling said voltage controlling means to distinguish between lagging and leading current transmitted by said armature winding and comprising an electric valve having an anode-cathode circuit and a grid circuit, one of which is energized in response to the armature voltage of said machine and the other of which is energized in accordance with the armature current of said machine.

2. In combination, an alternating current dynamo-electric machine having an armature winding and a field winding, means for controlling the energization of said field winding comprising a source of alternating current and electric valve means having a control member for controlling the conductivity thereof, voltage controlling means for energizing said control member to control the current conducted by said electric valve means in accordance with the voltage of said armature winding and comprising means for impressing on said control member an alternating component of voltage and an electronic discharge device for superimposing on said alternating component a unidirectional component of voltage which varies in accordance with the voltage of said armature winding, and means for controlling said voltage controlling means to distinguish between lagging and leading current transmitted by said armature winding and comprising an electric valve having an anode-cathode circuit and a grid circuit, one of which is energized in response to the armature voltage of said machine and the other of which is energized in accordance with the armature current of said machine.

3. In combination, an alternating current dynamo-electric machine having an armature winding and a field winding, mean for controlling the energization of said field winding comprising a source of alternating current and electric valve means having a control member for controlling the conductivity thereof, voltage controlling means for energizing said control member comprising an impedance element and an electronic discharge device for transmitting variable amounts of current through said impedance device in accordance with the voltage of said armature winding to impress a variable control voltage on said control member, and means for controlling the voltage across said impedance element to distinguish between leading and lagging current transmitted by said armature winding and comprising an electric valve having an anode-cathode circuit and a grid circuit, one of which is energized in response to the armature voltage of said machine and the other of which is energized in accordance with the armature current of said machine.

4. In combination, an alternating current dynamo-electric machine having an armature winding and a field winding, means for controlling the energization of said field winding comprising a source of alternating current and electric valve means having a control member for controlling the conductivity thereof, voltage controlling means for energizing said control member comprising an impedance element and an electronic discharge device for transmitting variable amounts of current through said impedance device in accordance with the voltage of said armature winding to impress a variable control voltage on said control member, and means connected across said impedance element for limiting the voltage appearing thereacross and for distinguishing between lagging and leading current transmitted by said armature winding.

5. In combination, an alternating current dynamo-electric machine having an armature winding and a field winding, means for controlling the energization of said field winding comprising a source of alternating current and electric valve means having a control member for controlling the conductivity thereof, voltage controlling means for energizing said control member comprising an impedance element and an electronic discharge device for transmitting variable amounts of current through said impedance element in accordance with the voltage of said armature winding to impress a variable control voltage on said control member, and means associated with said voltage controlling means and comprising a second electronic discharge device having an anode-cathode circuit energized in accordance with the current of said armature winding and having a control circuit energized in accordance with the voltage of said armature winding for distinguishing between lagging and leading current transmitted by said armature winding.

6. In combination, an alternating current dynamo-electric machine having an armature winding and a field winding, means for controlling the energization of said field winding and comprising a source of alternating voltage and electric valve means having a control member, voltage controlling means for energizing said control member to control the current conducted by said electric valve means in accordance with the voltage of said armature winding, means for controlling said voltage controlling means to distinguish between lagging and leading current transmitted by said armature winding and comprising an electric valve having an anode-cathode circuit and a grid circuit, one of which is energized in response to the armature voltage of said machine and the other of which is energized in accordance with the armature current of said machine, and time delay means connected between said last mentioned means and said voltage controlling means.

7. In combination, a synchronous condenser having an armature winding and a field winding, means for controlling the energization of said field winding comprising a source of alternating voltage and electric valve means having a control member, voltage controlling means for energizing said control member to control the current conducted by said electric valve means in accordance with the voltage of said armature winding, means for controlling said voltage controlling means to distinguish between lagging and leading current transmitted by said armature winding and comprising an electric valve having an anode-cathode circuit and a grid circuit, one of which is energized in response to the armature voltage of said machine and the other of which is energized in response to the armature current of said machine, and a circuit connected between said last mentioned means and said voltage controlling means to permit only instantaneous increases in the armature current above a predetermined value in the leading current region.

8. In combination, a synchronous condenser having an armature winding and a field winding, means for controlling the energization of said field winding and comprising a source of alternating current and electric valve means having a control member, voltage controlling means for impressing on said control member a voltage which varies in accordance with the voltage of said armature winding, and electric valve means responsive to the power factor of the armature current for limiting the value of said voltage to limit the current transmitted by said field winding.

9. In combination, an alternating current dynamo-electric machine having an armature winding and field winding, means for controlling the energization of said field winding and comprising a source of alternating current and electric valve means having a control member, a voltage controlling circuit comprising a rectifier for producing a unidirectional voltage which varies in magnitude in accordance with the voltage of said armature winding and a serially-connected impedance element and an electronic discharge device connected to be energized from said rectifier, and an electric valve circuit connected across said impedance element for controlling the voltage thereof in accordance with the power factor of the current transmitted by said armature winding.

10. In combination, an alternating current dynamo-electric machine having an armature winding and a field winding, means for controlling the energization of said field winding and comprising a source of alternating current and electric valve means having a control member, a voltage controlling circuit comprising a rectifier for producing a unidirectional voltage which varies in magnitude in accordance with the voltage of said armature winding and a serially-connected impedance element and an electronic discharge device connected to be energized from said rectifier, and means connected across said impedance element for controlling the voltage thereacross and comprising an electronic discharge device having anode-cathode and grid circuits, one of said last mentioned circuits being energized in accordance with the voltage of said armature winding and the other of said circuits being energized in accordance with the current of said armature winding.

11. In combination, an alternating current dynamo-electric machine having an armature winding and a field winding, means for controlling the energization of said field winding and comprising a source of alternating current and electric valve means having a control member, a voltage controlling circuit for energizing said control member and comprising a rectifier for producing a unidirectional voltage which varies in magnitude in accordance with the voltage of said armature winding and a serially-connected impedance element and an electronic discharge device connected to be energized from said rectifier, a second impedance element, means for varying the voltage across said second impedance element in accordance with the power factor of the armature current and comprising an electronic discharge device having anode-cathode and grid circuits, one of said last mentioned circuits being energized in accordance with the voltage of said armature winding and the other of said circuits being energized in accordance with the current of said armature winding, and a unidirectional conducting device connected between said first mentioned and said second mentioned impedance elements.

12. In combination, an alternating current circuit, means for controlling the voltage of said circuit and comprising electric valve means having a control member, a circuit for impressing a variable voltage on said control member and comprising a rectifier for producing a unidirectional voltage which varies in accordance with said first mentioned voltage and a serially-connected impedance element and an electronic discharge device energized from said rectifier, and means responsive to the power factor of said alternating current circuit for controlling the voltage across said impedance element.

13. In combination, an alternating current circuit, means for controlling the voltage of said circuit and comprising electric valve means having a control member, a circuit for impressing a variable voltage on said control member and comprising a rectifier for producing a unidirectional voltage which varies in accordance with said first mentioned voltage and a serially-connected impedance element and an electronic discharge device energized from said rectifier, and means connected across said impedance element for controlling the voltage thereof and comprising an electronic discharge device having anode-cathode and grid circuits, one of said last mentioned circuits being energized in accordance with the voltage of said alternating current circuit and the other of said circuits being energized in accordance with the current of said alternating current circuit.

14. In combination, an alternating current circuit, means for controlling the voltage of said circuit and comprising electric valve means having a control member, a circuit for impressing a variable voltage on said control member and comprising a rectifier for producing a unidirectional voltage which varies in accordance with said first mentioned voltage and a serially-connected impedance element and an electronic discharge device energized from said rectifier, means connected across said impedance element for controlling the voltage thereof and comprising a circuit including an electronic discharge device having anode-cathode and grid circuits, one of said last mentioned circuits being energized in accordance with the voltage of said alternating current circuit and the other of said circuits being energized in accordance with the current of said alternating current circuit, a second impedance element energized by said last mentioned electronic discharge means, and a unidirectional conducting device connected between said first mentioned and said second mentioned impedance elements.

15. In combination, an alternating current circuit, means for controlling the voltage of said circuit and comprising electric valve means having a control member, a circuit for impressing a variable voltage on said control member and comprising a rectifier for producing a unidirectional voltage which varies in accordance with said first mentioned voltage and a serially-connected impedance element and an electronic discharge device energized from said rectifier, means connected across said impedance element for limiting the voltage thereof in accordance with the current and power factor of said alternating current circuit and comprising a circuit including an electronic discharge means having anode-cathode and grid circuits, one of said last mentioned circuits being energized in accordance with the voltage of said alternating current circuit and the other of said circuits being energized in accordance with the current of said alternating current circuit, a second impedance element energized by said electronic discharge means, and an electric valve connected between said first mentioned and said second mentioned impedance elements to conduct current therebetween when the voltage of said second mentioned impedance element attains a predetermined value.

ELMO E. MOYER.
ORRIN W. LIVINGSTON.